(12) United States Patent
Chang et al.

(10) Patent No.: US 11,494,013 B2
(45) Date of Patent: *Nov. 8, 2022

(54) TOUCH PANEL AND FABRICATING METHOD THEREOF

(71) Applicant: TPK Film Solutions (Xiamen) Inc., Xiamen (CN)

(72) Inventors: Liang-Yi Chang, Taoyuan (TW); Chien-Hung Kuan, Taoyuan (TW); Renqing Peng, Xiamen (CN); Jiachun Li, Chengdu (CN)

(73) Assignee: TPK Film Solutions (Xiamen) Inc., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,119

(22) Filed: Sep. 4, 2020

(65) Prior Publication Data

US 2020/0401260 A1 Dec. 24, 2020

Related U.S. Application Data

(63) Continuation of application No. 15/206,316, filed on Jul. 11, 2016, now Pat. No. 10,768,727.

(30) Foreign Application Priority Data

Jul. 11, 2015 (CN) .......................... 201510425408.8

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0445* (2019.05); *G06F 3/0446* (2019.05); *G06F 2203/04103* (2013.01); *G06F 2203/04111* (2013.01)

(58) Field of Classification Search
CPC .... G06F 3/0412; G06F 3/0445; G06F 3/0446; G06F 3/044; G06F 2203/04103; G06F 2203/04111
See application file for complete search history.

(56) References Cited

U.S. PATENT DOCUMENTS

| 10,768,727 | B2* | 9/2020 | Chang | G06F 3/0446 |
| 2012/0094037 | A1* | 4/2012 | Banba | C09J 7/385 |
| | | | | 428/1.5 |
| 2013/0120287 | A1* | 5/2013 | Oh | G06F 3/0418 |
| | | | | 345/173 |
| 2015/0060251 | A1* | 3/2015 | Wu | G06F 3/0446 |
| | | | | 200/5 R |

(Continued)

FOREIGN PATENT DOCUMENTS

TW M499647 U * 4/2015

*Primary Examiner* — Stacy Khoo
(74) *Attorney, Agent, or Firm* — Cooper Legal Group, LLC

(57) ABSTRACT

A touch panel includes a cover plate, a first adhesive component, and a second adhesive component. The first adhesive component which is adhered underneath the cover plate, includes a plurality of first pattered sensing lines. The second adhesive component which is adhered underneath the first adhesive component, includes a plurality of second pattered sensing lines. The first pattered sensing lines and second pattered sensing lines are electrically insulated from each other.

20 Claims, 10 Drawing Sheets

(56) References Cited

U.S. PATENT DOCUMENTS

2015/0253903 A1* 9/2015 Lee .................. G06F 3/0446
345/174
2015/0346866 A1* 12/2015 Kusunoki ............ G06F 3/0446
345/174

* cited by examiner

TOUCH PANEL AND FABRICATING METHOD THEREOF

RELATED APPLICATIONS

This application is a continuation of U.S. patent application Ser. No. 15/206,316, filed on Jul. 11, 2016, which claims priority to Chinese Patent Application Serial Number 201510425408.8, filed in the People's Republic of China on Jul. 11, 2015. U.S. patent application Ser. No. 15/206,316 and Chinese Patent Application Serial Number 201510425408.8 are herein incorporated by reference.

BACKGROUND

Field of the Disclosure

The present disclosure relates to touch technology. More particularly, the present disclosure relates to a touch panel and a fabricating method thereof.

Description of the Related Art

Currently, touch panels are extensively applied to portable electronic devices, such as teller machines, mobile phones, cameras, game consoles, tablet computers and so on, to achieve friendly and intuitive human-computer interaction and increase convenience of use.

At present, many capacitive touch panels use a laminated structure. A superficial substrate is usually a glass cover plate made of glass material. The glass cover plate is mainly used to protect underlying touch components and lower substrates are mainly used for support. Sensing lines which are used to detect variation of signals caused by finger or stylus are formed over the lower substrates, and an external controller detects the touched position according to the variation of the signals. Among current techniques, an adhesive layer is necessary between the lower substrate and other stacked structure, whereby these components are combined into a touch panel. However, in order to fulfill a requirement of load bearing, the lower bearing substrates must have a certain thickness. However, when the number of the bearing substrates increases, the total thickness of the touch panel is thickened accordingly. Therefore, research continues on how to reduce the thickness of the touch panel. Accordingly, a new touch panel and fabricating method thereof are needed.

SUMMARY

The present disclosure provides a touch panel with a plurality of sensing lines directly forming on an adhesive bearing layer. Because the adhesive bearing layer can directly adhere to other layers, additional adhesive layer is unnecessary. Therefore, the process steps can be reduced. The stickiness of the adhesive bearing layer make the sensing lines adhere to the adhesive bearing layer better to avoid the sensing lines detaching during fabrication.

An aspect of the instant disclosure is a touch panel. The touch panel includes a cover plate; a first adhesive component adhered underneath the cover plate and including a plurality of first patterned sensing lines; and a second adhesive component adhered underneath the first adhesive component and including a plurality of second patterned sensing lines, wherein the first patterned sensing lines and second patterned sensing lines are electrically insulated from each other.

In accordance with some embodiments of the present disclosure, a touch panel includes a cover plate; and an adhesive component adhered underneath the cover plate wherein the adhesive component includes a plurality of first patterned sensing lines; and a plurality of second patterned sensing lines wherein the first patterned sensing lines and the second patterned sensing lines are electrically insulated form and intersected with each other in a same layer.

Another aspect of the instant disclosure is a method of fabricating a touch panel. The method includes providing a cover plate; adhering a first adhesive component underneath the cover plate and the first adhesive component including a plurality of first patterned sensing lines; and adhering a second adhesive component underneath the first adhesive component and the second adhesive component including a plurality of second patterned sensing lines wherein the first patterned sensing lines and second patterned sensing lines are electrically insulated from each other.

Another aspect of the present disclosure is a method of fabricating a touch panel. The method includes providing a cover plate; and adhering an adhesive component underneath the cover plate wherein the adhesive component includes a plurality of first patterned sensing lines; and a plurality of second patterned sensing lines wherein the first patterned sensing lines and the second patterned sensing lines are electrically insulated from and intersected with each other in a same layer.

DETAILED DESCRIPTION

Figure 1:
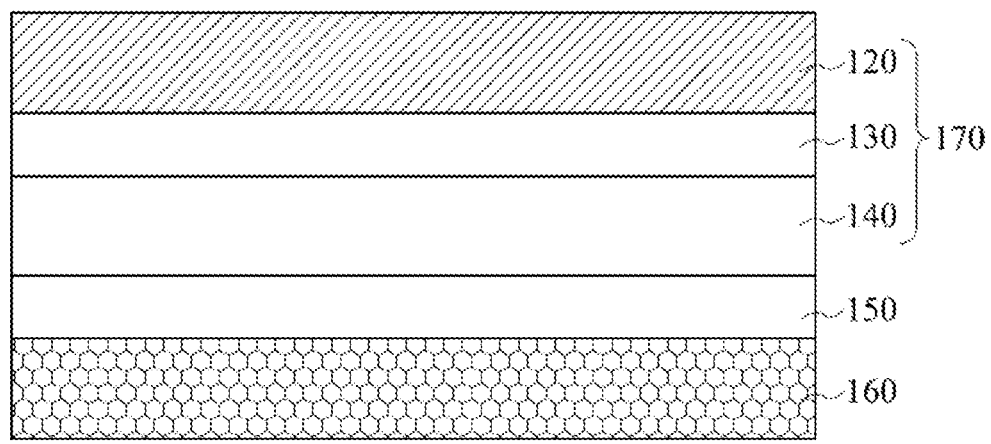
FIG. 1 shows a touch device according to some embodiments of the instant disclosure.

Reference will now be made in detail to the present embodiments of the disclosure, examples of which are illustrated in the accompanying drawings. Wherever possible, the same reference numbers are used in the drawings and the description to refer to the same or like parts.

As shown in FIG. 1, FIG. 1 shows a touch device 100 according to some embodiments of the instant disclosure. The touch device 100 includes a cover plate 120, a first adhesive component 130, a second adhesive component 140, an adhesive layer 150, and a display panel 160. The first adhesive component 130 is adhered underneath the cover plate 120 and includes a plurality of first patterned sensing lines (not shown). The second adhesive component 140 is adhered underneath the first adhesive component 130 and includes a plurality of second patterned sensing lines (not shown). The first patterned sensing lines and second patterned sensing lines are electrically insulated from each other.

According to some embodiments of the instant disclosure, the first adhesive component 130 further includes a first adhesive bearing layer (not shown). The first patterned sensing lines are directly formed on the first adhesive bearing layer and the first patterned sensing lines are adhered to the cover plate 120 by the first adhesive bearing layer. The second adhesive component 140 further includes a second adhesive bearing layer (not shown). The second patterned sensing lines are directly formed on the second adhesive bearing layer and the second patterned sensing lines are adhered to the first adhesive component 130 by the second adhesive bearing layer. A touch panel 170 includes the cover plate 120, the first adhesive component 130, and the second adhesive component 140. According to some embodiments of the instant disclosure, the touch panel 170 is adhered to the display panel 160 by the adhesive layer 150. Referring to FIGS. 4A-6B, FIGS. 4A-6B show various embodiments and fabrication methods of structure of the touch device.

According to some embodiments of the instant disclosure, the cover plate 120 may be some transparent materials and includes but not limited to rigid cover plate or flexible cover plate. For example, a material of the cover plate is glass, polycarbonate (PC), polyethylene terephthalate (PET), polymethylmesacrylate, (PMMA), poly vinyl chloride (PVC), polypropylene (PP), polystyrene (PS), polymethyl methacrylate (PMMA), polyethylene (PE), polysulfone (PSU), cyclic olefin copolymer (COC), etc.

According to some embodiments of the instant disclosure, the adhesive bearing layer (first adhesive bearing layer or second adhesive bearing layer) has a top surface and a lower surface opposite to the top surface. Both the top surface and the lower surface are adhesive and each surface has a release film (not shown). If the top surface or the lower surface need adhere to other components, the release films are removed, such that the top surface or the lower surface can adhere to other components. A material of the adhesive bearing layer (first adhesive bearing layer or second adhesive bearing layer) may be optically clear adhesive (OCA) or optically clear resin (OCR) and includes but is not limited to unsaturated polyester adhesive, silicone rubber adhesive, acrylic resin adhesive, polyurethane adhesive, epoxy resin adhesive or a combination thereof.

According to some embodiments of the instant disclosure, the display panel 160 includes but is not limited to a liquid crystal module. Components of the display panel 160 include but are not limited to a controller or a circuit board.

Figure 2A:
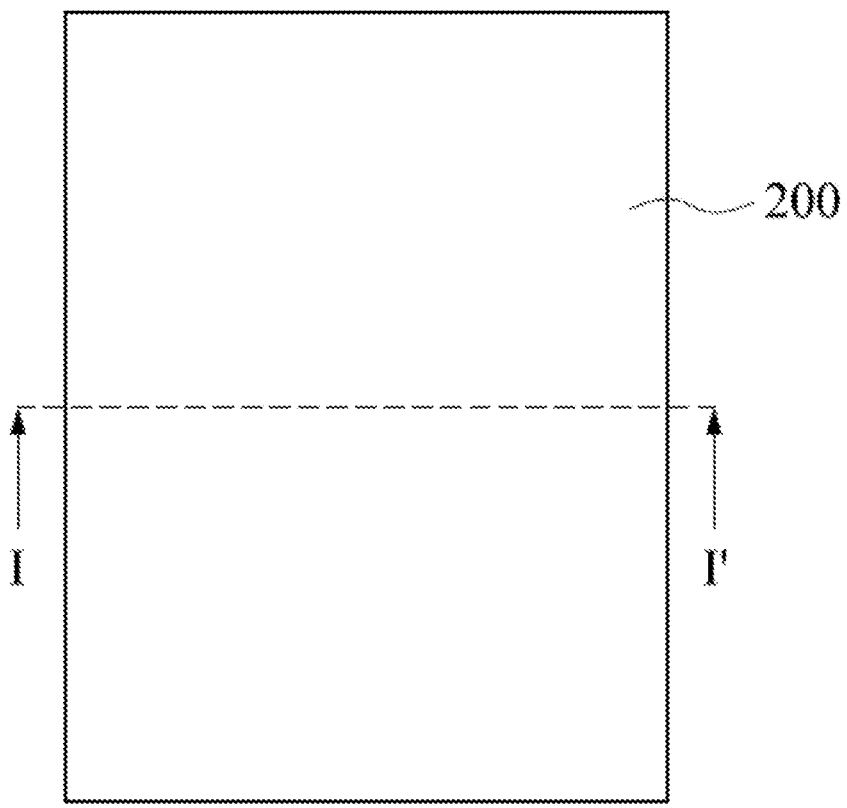
FIGS. 2A-3B show schematic diagrams and cross-section views of a fabrication method for coating a conducting layer over an adhesive bearing layer according to some embodiments of the instant disclosure.
Figure 2B:
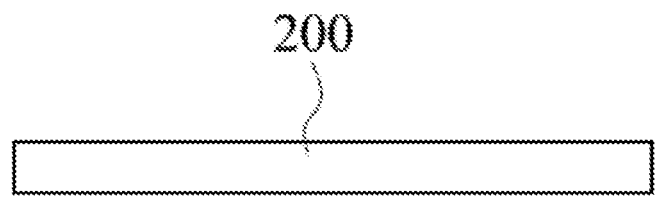

FIGS. 2A-3B show schematic diagrams of a fabrication method and cross-section views for coating a conducting layer 300 over an adhesive bearing layer 200 (first adhesive bearing layer or second adhesive bearing layer) to form a plurality of patterned sensing lines (first patterned sensing lines or second patterned sensing lines) according to some embodiments of the instant disclosure. As shown in FIG. 2A, the adhesive bearing layer 200 is provided. FIG. 2B is a cross-section view along a section line I-I' of FIG. 2A. In FIG. 2A and FIG. 2B, each of a top surface and a lower surface of the adhesive bearing layer 200 has a release film (not shown). Before the conducting layer 300 is coated over the top surface of the adhesive bearing layer 200, the release film of the top surface of the adhesive bearing layer 200 is removed, thereby the conducting layer 300 is directly coated over the top surface of the adhesive bearing layer 200 with stickiness.

Figure 3A:
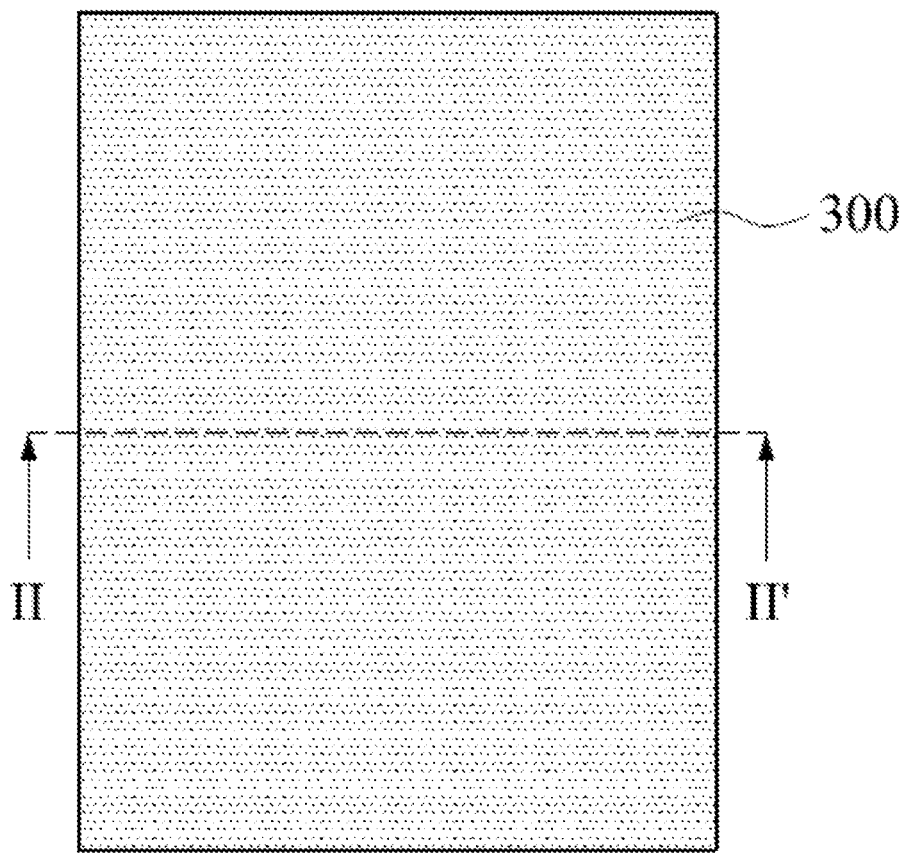
Figure 3B:
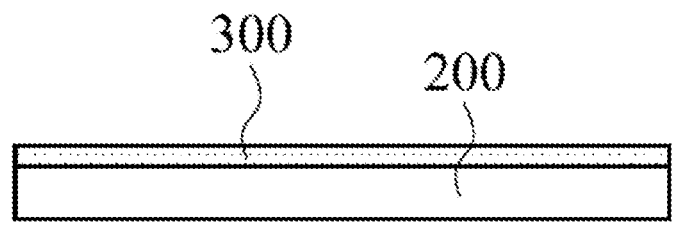

FIG. 3B is a cross-section view along a section line II-II' of FIG. 3A. As shown in FIG. 3A and FIG. 3B, the conducting layer 300 is coated over the top surface of the adhesive bearing layer 200. According to some embodiments of the instant disclosure, the coating is by sputtering, electroplating, printing, spin coating, wet coating, or other methods. Compared to traditional techniques in which a conducting layer is directly formed on a bearing substrate, which usually induces problems such as low adhesive force between the conducting layer and the bearing substrate, the instant disclosure utilizes the feature that the surface of the adhesive bearing layer is sticky to coat directly the conducting layer 300 over the surface of the adhesive bearing layer 200. An adhesion force between the conducting layer 300 and the adhesive bearing layer 200 is enhanced by the stickiness of the adhesive bearing layer 200 to reduce a risk of detachment of the conducting layer 300. According to some embodiments of the instant disclosure, a material of the conducting layer 300 includes but is not limited to silver nanowire.

Subsequently, the conducting layer 300 is etched to form a plurality of patterned sensing lines (first patterned sensing lines or second patterned sensing lines). According to some embodiments of the instant disclosure, after etching, one aspect of the patterned sensing lines may refer to a plurality of first patterned sensing lines 444 shown in FIG. 4B. According to other embodiments of the instant disclosure, after etching, one aspect of the patterned sensing lines may refer to a biaxially-oriented single-layer line formed by a plurality of first patterned sensing lines 744 and a plurality of second patterned sensing lines 748 shown in FIG. 8. The first patterned sensing lines 744 and the second patterned sensing lines 748 intersect each other in a same layer and are electrically insulated from each other.

According to some embodiments of the instant disclosure, the etching is performed by any traditional etching process and includes but is not limited to laser etching, chemical etching, plasma etching, or photolithography.

Figure 4A:
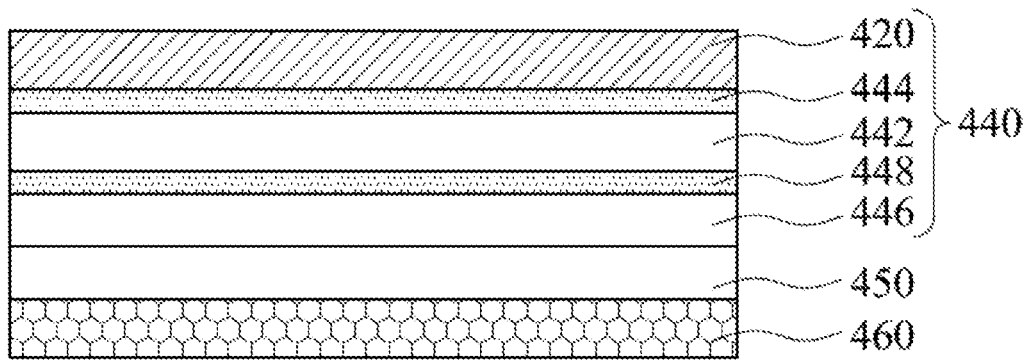
FIG. 4A shows a touch device according to some embodiments of the instant disclosure.
Figure 4B:
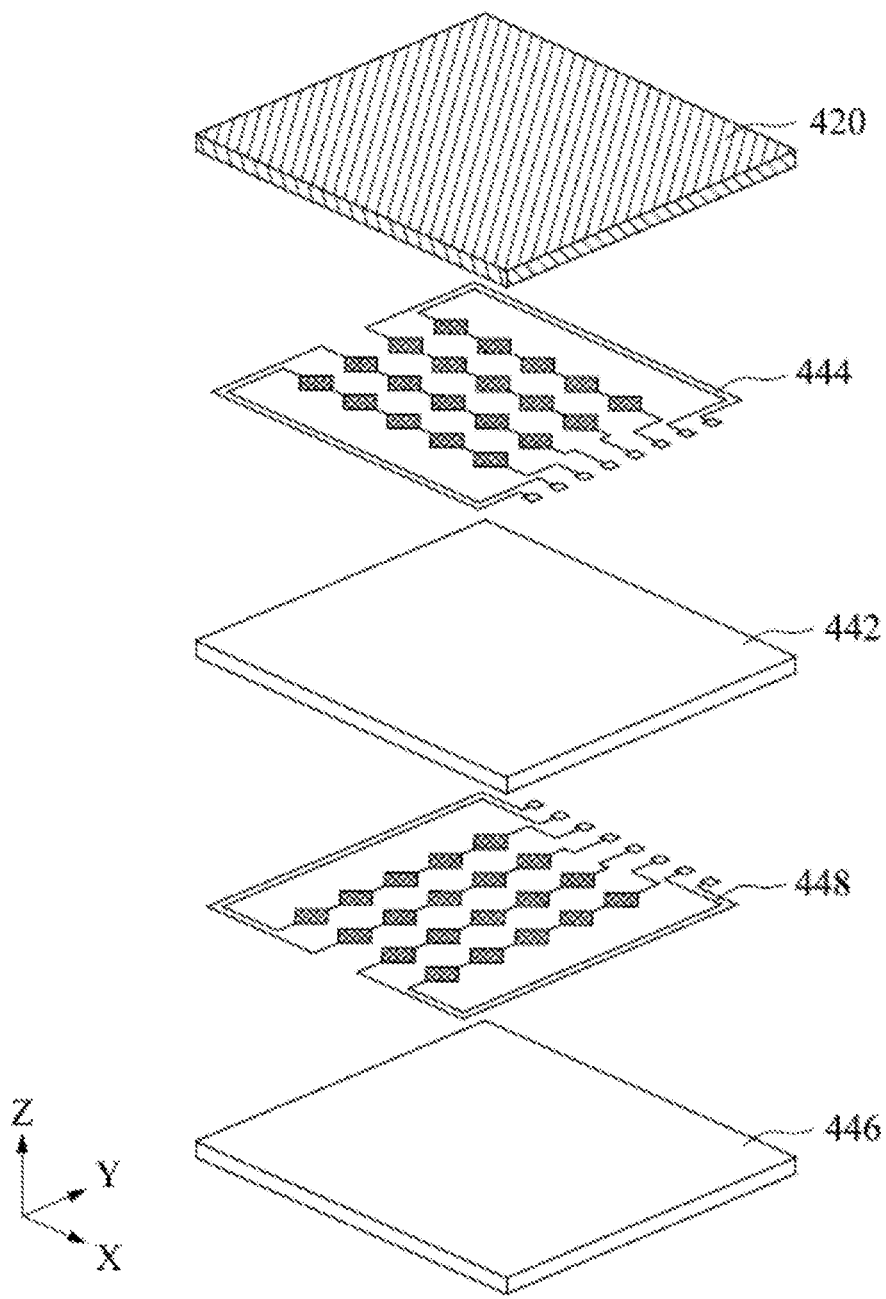
FIG. 4B shows a schematic diagram of the touch panel in FIG. 4A.

FIG. 4A shows a touch device 400 according to some embodiments of the instant disclosure. FIG. 4B shows a schematic diagram of a touch panel 440 in FIG. 4A. The touch device 400 includes the touch panel 440, an adhesive layer 450, and a display panel 460. The touch panel 440 includes a cover plate 420, a first adhesive bearing layer 442, a second adhesive bearing layer 446, a plurality of first patterned sensing lines 444 and a plurality of second patterned sensing lines 448. The first patterned sensing lines 444 are directly formed on the first adhesive bearing layer 442 such that a lower surface of the first patterned sensing lines 444 are in direct contact with the first adhesive bearing layer 442. The second patterned sensing lines 448 are directly formed on the second adhesive bearing layer 446 such that a lower surface of the second patterned sensing lines 448 are in direct contact with the second adhesive bearing layer 446. According to some embodiments of the instant disclosure, the adhesive layer 450 is between the touch panel 440 and the display panel 460. A thickness of the adhesive layer 450 ranges from 15 μm to 20 μm. According to some embodiments of the instant disclosure, the adhesive layer 450 is omitted such that the second adhesive bearing layer 446 is directly adhered on the display panel 460.

According to some embodiments of the instant disclosure, the first patterned sensing lines 444 are directly formed on the first adhesive bearing layer 442. The first adhesive bearing layer 442 is used as a bearing substrate of the first patterned sensing lines 444 and adheres to the first patterned sensing lines 444 to the cover plate 420. The first patterned sensing lines 444 are easily scratched during subsequent fabrication. Further, when a material of the first patterned sensing lines 444 is a metal nanostructure (silver nanowire), the first patterned sensing lines 444 are easily oxidized by air to influence a conductivity of the first patterned sensing lines 444. Therefore, the first adhesive bearing layer 442 directly covering the first patterned sensing lines 444 can protect the first patterned sensing lines 444. Further, because the first patterned sensing lines 444 are formed on the first adhesive bearing layer 442 by laser or etching, a difference in etching step height exists between the region having the sensing lines and the region without the sensing lines over the first adhesive bearing layer 442. If the first patterned sensing lines 444 are required to be fully protected by the first adhesive bearing layer 442, the difference in etching step height should preferably be overcome, so that the first adhesive bearing layer 442 can fully cover the first patterned sensing lines 444. Therefore, a thickness of the first adhesive bearing layer 442 increases accordingly. The thickness of the first adhesive bearing layer 442 ranges from 40 μm to 60 μm. The first adhesive bearing layer 442 directly covers the second patterned sensing lines 448 such that a top surface of the second patterned sensing lines 448 is in direct contact with the first adhesive bearing layer 442. Therefore, the first adhesive bearing layer 442 may protect the second patterned sensing lines 448 as well. Further, the second patterned sensing lines 448 are formed on the second adhesive bearing layer 446 by laser or etching. Therefore, in order to protect another exposed surface of the second patterned sensing lines 448, the second adhesive bearing layer 446 has to overcome a difference in etching step height of the second patterned sensing lines 448, so as to fully cover the second patterned sensing lines 448. Accordingly, in some embodiments, a thickness of the second adhesive bearing layer 446 ranges from 40 μm to 60 μm. Further, although FIG. 4A shows the area of the first adhesive bearing layer 442 is the same as the area of the first patterned sensing lines 444, the area of the first adhesive bearing layer 442 is generally larger than the area of the first patterned sensing lines 444 in actual fabrication. More specifically, the first patterned sensing lines 444 are practically positioned at a central region (corresponding to a visual region of touch panel 440) of the first adhesive bearing layer 442. A peripheral region (corresponding to a non-visible region of touch panel 440) of the first adhesive bearing layer 442 still remains a certain area to adhere the first patterned sensing lines 444 to the cover plate 420. Similarly, the area of the second adhesive bearing layer 446 is generally larger than the area of the second patterned sensing lines 448. The second patterned sensing lines 448 are adhered to the first adhesive bearing layer 442 by the stickiness between the first adhesive bearing layer 442 and the second adhesive bearing layer 446.

Referring to FIG. 4B, a method for fabricating the touch panel 440 is provided. The method includes at least the following steps. A first adhesive bearing layer 442 is provided. A first conducting layer is coated over the first adhesive bearing layer 442. The first conducting layer is etched to form the first patterned sensing lines 444. A cover plate 420 is provided and the first patterned sensing lines 444 are adhered to the cover plate 420 by the first adhesive bearing layer 442. A second adhesive bearing layer 446 is provided. A second conducting layer is coated over the second adhesive bearing layer 446 and the second conducting layer is etched to form a plurality of second patterned sensing lines 448 electrically insulated from the first patterned sensing lines 444. The second patterned sensing lines 448 are adhered to the first adhesive bearing layer 442 by the second adhesive bearing layer 446. The step of coating these conducting layers may refer to the schematic diagrams of fabrication method and the cross-section views for coating conducting layer over the adhesive bearing layer as shown in FIG. 2A to FIG. 3B.

As shown in FIG. 4B, the first patterned sensing lines 444 include electrodes arranged along the X axis and conducting lines connecting electrodes. The second patterned sensing lines 448 include electrodes arranged along the Y axis and conducting lines connecting electrodes. The electrode shape of these patterned sensing lines is a rhombus, without limitation thereto. The electrode shape may be a square, rectangle, regular hexagon, or an irregular pattern with randomized arrangement. According to some embodiments of the instant disclosure, a material of these patterned sensing lines includes but is not limited to silver nanowire.

Figure 5A:
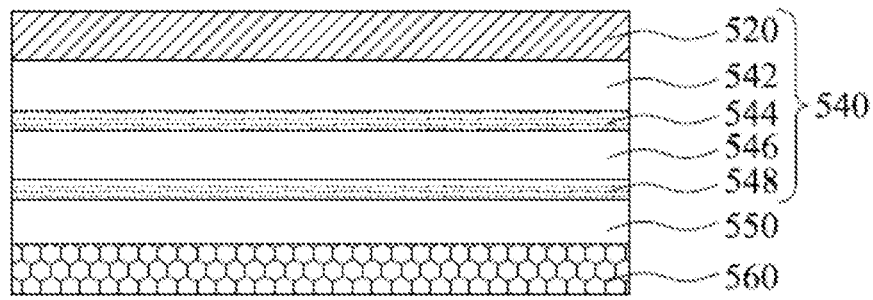
FIG. 5A shows a touch device according to some embodiments of the instant disclosure.
Figure 5B:
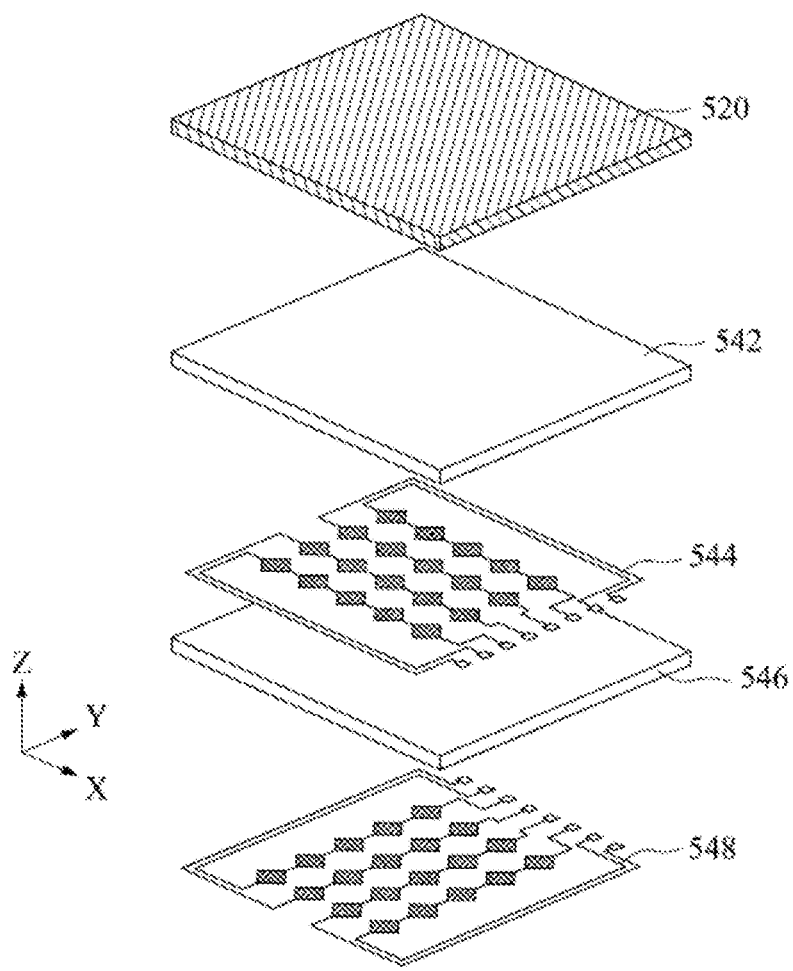
FIG. 5B shows a schematic diagram of the touch panel in FIG. 5A.

FIG. 5A shows a touch device 500 according to some embodiments of the instant disclosure. FIG. 5B shows a schematic diagram of the touch panel 540 in FIG. 5A. A touch device 500 includes a touch panel 540, an adhesive layer 550, and a display panel 560 wherein the touch panel 540 includes a cover plate 520, a first adhesive bearing layer 542, a second adhesive bearing layer 546, a plurality of first patterned sensing lines 544 and a plurality of second patterned sensing lines 548. The first patterned sensing lines 544 are directly formed under the first adhesive bearing layer 542 such that a top surface of the first patterned sensing lines 544 are in direct contact with the first adhesive bearing layer 542. The second patterned sensing lines 548 are directly formed under the second adhesive bearing layer 546 such that a top surface of the second patterned sensing lines 548 are in direct contact with the second adhesive bearing layer 546. The adhesive layer 550 is between the touch panel 540 and the display panel 560 to adhere the touch panel 540 to the display panel 560. In order to overcome a difference in etching step height of the second patterned sensing lines 548, the adhesive layer 550 may fully cover the second patterned sensing lines 548. A thickness of the adhesive layer 550 ranges from 32 μm to 38 μm. According to some embodiments of the instant disclosure, the first patterned sensing lines 544 are positioned under the first adhesive bearing layer 542. The first adhesive bearing layer 542 is used as a bearing substrate of the first patterned sensing lines 544 and adheres the first patterned sensing lines 544 to the cover plate 520. In some embodiments, the first adhesive bearing layer 542 does not cover the difference in etching step height of the first patterned sensing lines 544. Therefore, a thickness of the first adhesive bearing layer 542 ranges from 25 μm to 30 μm. When the first patterned sensing lines 544 are directly formed on the first adhesive bearing layer 542 and is adhered to the cover plate 520, the first patterned sensing lines 544 are exposed to air during fabrication. The first patterned sensing lines 544 are easily scratched during subsequent fabrication. Further, when a material of the first patterned sensing lines 544 is a metal nanostructure (silver nanowire), the first patterned sensing lines 544 are easily oxidized by air to influence a conductivity of the first patterned sensing lines 544. Therefore, it is necessary to add a protection layer under the first patterned sensing lines 544. In some embodiments, the second adhesive bearing layer 546 is used as a bearing substrate of the second patterned sensing lines 548 and directly covers the first patterned sensing lines 544. Therefore, the second adhesive bearing layer 546 is used to protect the first patterned sensing lines 544, and cause the lower surface of the first patterned sensing lines 544 to be in direct contact with the second adhesive bearing layer 546. Further, because the first patterned sensing lines 544 are formed on the first adhesive bearing layer 542 by laser or etching, a difference in etching step height exists between the region having the sensing lines and the region without the sensing lines over the first adhesive bearing layer 542. If the first patterned sensing lines 544 are required to be fully protected by the second adhesive bearing layer 546, the difference in etching step height should be overcome, so that the second adhesive bearing layer 546 fully covers the first patterned sensing lines 544. Therefore, a thickness of the second adhesive bearing layer 546 increases. In at least one preferred embodiment, a thickness of the second adhesive bearing layer 546 ranges from 40 μm to 60 μm.

Referring to FIG. 5B, a method for fabricating the touch panel 540 is provided. The method includes at least the following steps. A first adhesive bearing layer 542 is provided. A first conducting layer is coated under the first adhesive bearing layer 542. The first conducting layer is etched to form the first patterned sensing lines 544. A cover plate 520 is provided and the first patterned sensing lines 544 is adhered to the cover plate 520 by the first adhesive bearing layer 542. A second adhesive bearing layer 546 is provided. A second conducting layer is coated under the second adhesive bearing layer 546 and the second conducting layer is etched to form a plurality of second patterned sensing lines 548 electrically insulated from the first patterned sensing lines 544. The second patterned sensing lines 548 are directly adhered to the first patterned sensing lines 544 by the second adhesive bearing layer 546. The step of coating these conducting layers may refer to the schematic diagrams of fabrication method and the cross-section views for coating conducting layer over the adhesive bearing layer as shown in FIG. 2A to FIG. 3B.

The details of the first patterned sensing lines 544 and the second patterned sensing lines 548 refer to the descriptions of the first patterned sensing lines 444 and the second patterned sensing lines 448 as shown in FIG. 4B.

Figure 6A:
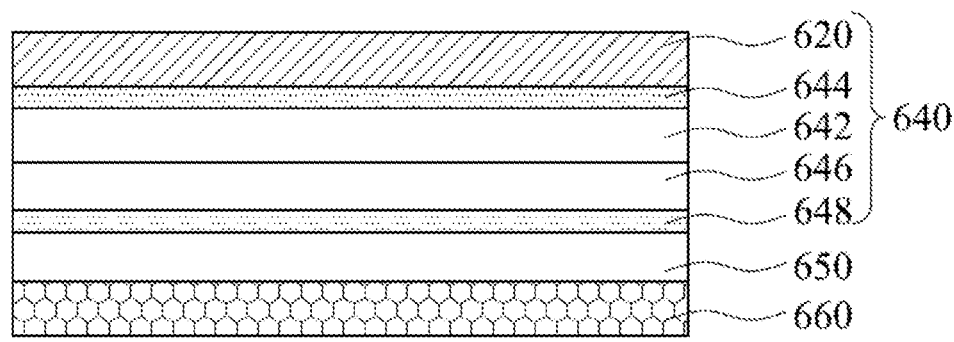
FIG. 6A shows a touch device according to some embodiments of the instant disclosure.
Figure 6B:
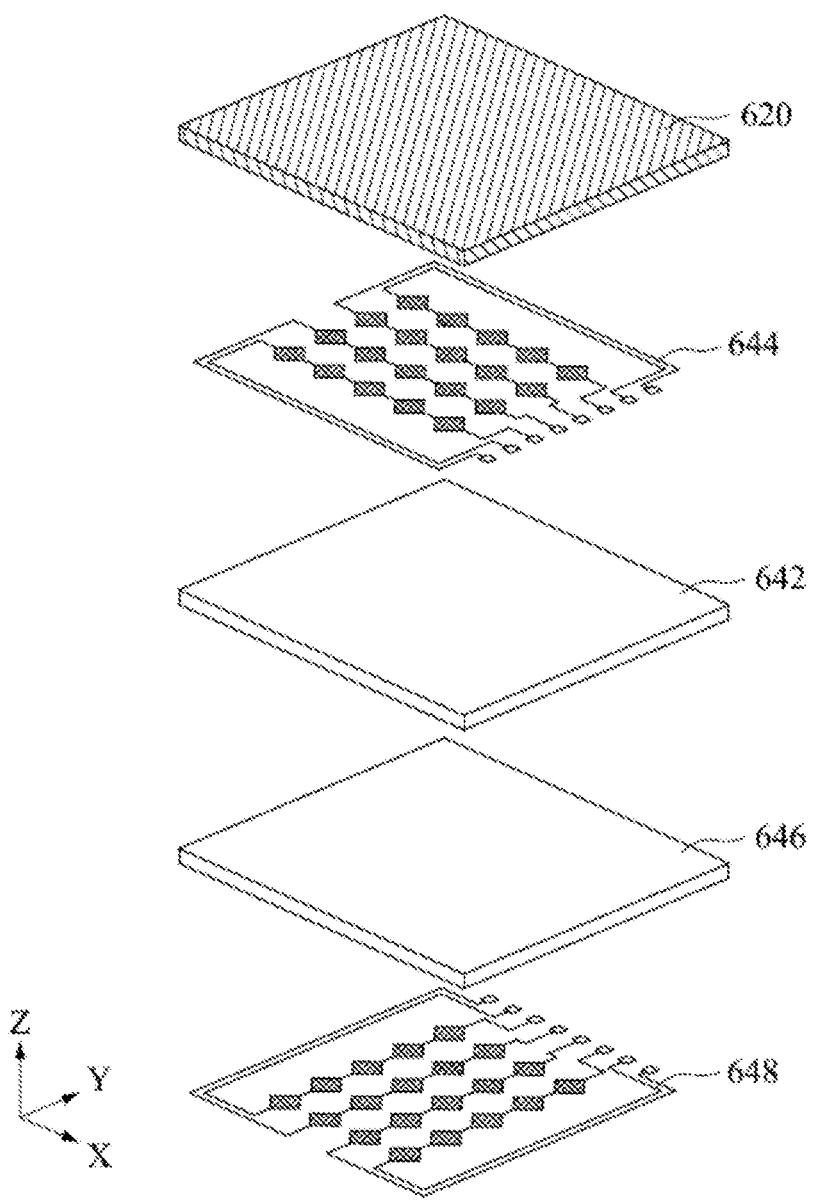
FIG. 6B shows a schematic diagram of the touch panel in FIG. 6A.

FIG. 6A shows a touch device 600 according to some embodiments of the instant disclosure. FIG. 6B shows a schematic diagram of a touch panel 640 in FIG. 6A. The touch device 600 includes the touch panel 640, an adhesive layer 650, and a display panel 660. The touch panel 640 includes a cover plate 620, a first adhesive bearing layer 642, a second adhesive bearing layer 646, a plurality of first patterned sensing lines 644 and a plurality of second patterned sensing lines 648. The first patterned sensing lines 644 are directly formed on the first adhesive bearing layer 642 such that a lower surface of the first patterned sensing lines 644 are in direct contact with the first adhesive bearing layer 642. The second patterned sensing lines 648 are directly formed under the second adhesive bearing layer 646 such that a top surface of the second patterned sensing lines 648 are in direct contact with the second adhesive bearing layer 646. Further, the second patterned sensing lines 648 are adhered to the first adhesive bearing layer 642 by the second adhesive bearing layer 646. In other words, the first patterned sensing lines 644 are adhered to the second adhesive bearing layer 646 by the first adhesive bearing layer 642. According to some embodiments of the instant disclosure, the adhesive layer 650 is between the touch panel 640 and the display panel 660 to adhere the touch panel 640 to the display panel 660. In order to overcome a difference in etching step height of the second patterned sensing lines 648, the adhesive layer 650 may fully cover the second patterned sensing lines 648. A thickness of the adhesive layer 650 ranges from 32 μm to 38 μm. According to some embodiments of the instant disclosure, a material of the patterned sensing lines includes but is not limited to silver nanowires.

According to some embodiments of the instant disclosure, the first patterned sensing lines 644 are disposed over the first adhesive bearing layer 642. The first adhesive bearing layer 642 is used as a bearing substrate of the first patterned sensing lines 644 and adheres the first patterned sensing lines 644 to the cover plate 620. In order to cover fully the first patterned sensing lines 644 and overcome a difference in etching step height of the first patterned sensing lines 644, a thickness of the first adhesive bearing layer 642 increases accordingly. Thickness of the first adhesive bearing layer 642 ranges from 40 μm to 60 μm. Further, the second adhesive bearing layer 646 is used as a bearing substrate of the second patterned sensing lines 648 and adheres the second patterned sensing lines 648 to the first adhesive bearing layer 642. Therefore, the second adhesive bearing layer 646 is unnecessary to cover the difference in etching step height of the second patterned sensing lines 648. Accordingly, a thickness of the second adhesive bearing layer 646 ranges from 25 μm to 30 μm.

Further, it is worth noting that although FIG. 6A shows the area of the first adhesive bearing layer 642 is the same as the area of the first patterned sensing lines 644, the area of the first adhesive bearing layer 642 is generally larger than the area of the first patterned sensing lines 644 in actual fabrication. More specifically, the first patterned sensing lines 644 are practically positioned at a central region (corresponding to a visual region of touch panel 640) of the first adhesive bearing layer 642. A peripheral region (corresponding to a non-visible region of the touch panel 640) of the first adhesive bearing layer 642 still remains a certain area to adhere the first patterned sensing lines 644 to the cover plate 620.

Referring to FIG. 6B, a method for fabricating the touch panel 640 is provided. The method includes at least the following steps. The first adhesive bearing layer 642 is provided. A first conducting layer is coated over the first adhesive bearing layer 642. The first conducting layer is etched to form the first patterned sensing lines 644. The cover plate 620 is provided and the first patterned sensing lines 644 are directly adhered to the cover plate 620 by the first adhesive bearing layer 642. A second adhesive bearing layer 646 is provided. A second conducting layer is coated under the second adhesive bearing layer 646 and the second conducting layer is etched to form a plurality of second patterned sensing lines 648 electrically insulated from the first patterned sensing lines 644. The second patterned sensing lines 648 are directly adhered to the first adhesive bearing layer 642 by the second adhesive bearing layer 646. The step of coating these conducting layers may refer to the schematic diagrams of fabrication method and the cross-section views for coating conducting layer over the adhesive bearing layer as shown in FIG. 2A to FIG. 3B.

The details of the first patterned sensing lines 644 and the second patterned sensing lines 648 refer to the descriptions of the first patterned sensing lines 444 and the second patterned sensing lines 448 as shown in FIG. 4B.

Figure 7A:
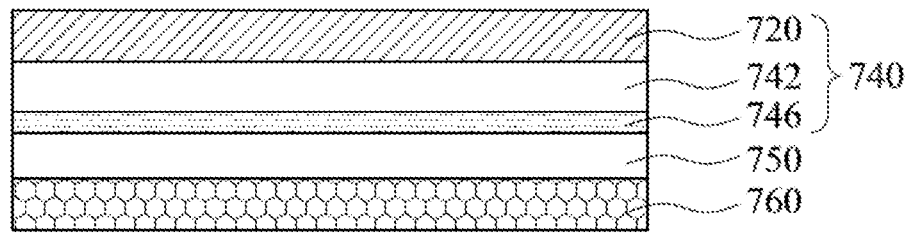
FIG. 7A shows a touch device according to some embodiments of the instant disclosure.
Figure 7B:
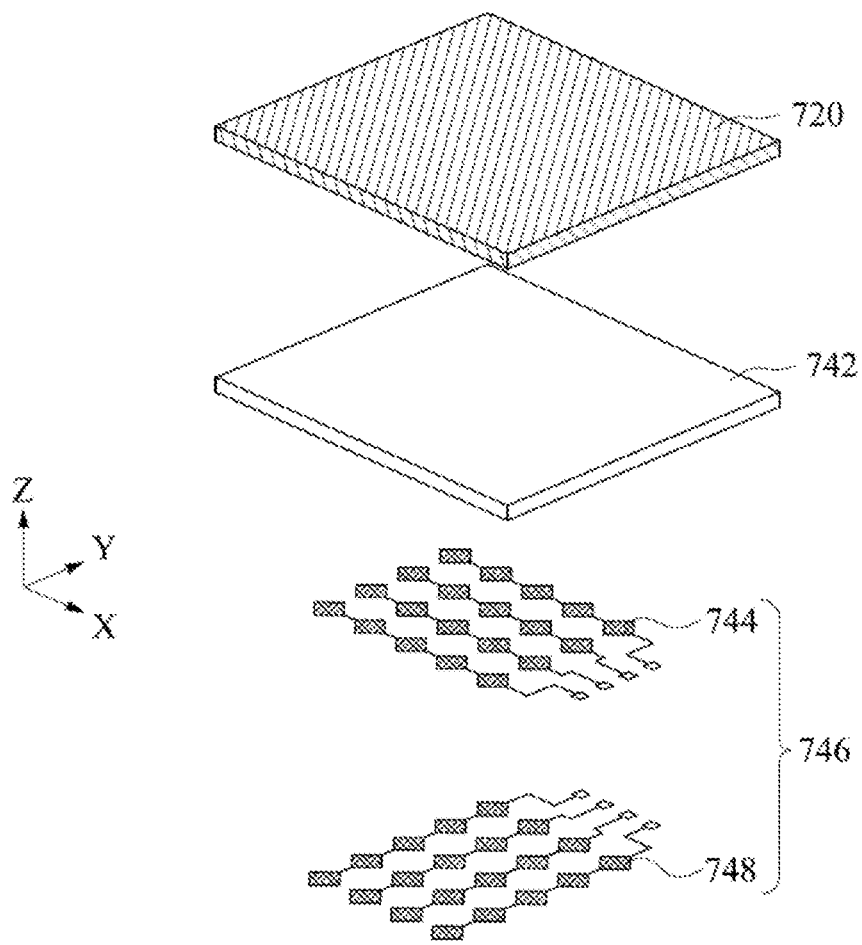
FIG. 7B shows a schematic diagram of the touch panel in FIG. 7A.

FIG. 7A shows a touch device 700 according to some embodiments of the instant disclosure. FIG. 7B shows a schematic diagram of a touch panel 740 in FIG. 7A. The touch device 700 includes the touch panel 740, an adhesive layer 750, and a display panel 760. The touch panel 740 includes a cover plate 720, an adhesive bearing layer 742, and patterned sensing lines 746. The patterned sensing lines 746 are directly formed under the adhesive bearing layer 742 such that a top surface of the patterned sensing lines 746 is in direct contact with the adhesive bearing layer 742. The patterned sensing lines 746 and the adhesive bearing layer 742 form an adhesive component. The adhesive layer 750 is between the touch panel 740 and the display panel 760 to adhere the touch panel 740 to the display panel 760. In order to overcome a difference in etching step height of the patterned sensing lines 746, the adhesive layer 750 may fully cover the patterned sensing lines 746. A thickness of the adhesive layer 750 ranges from 32 μm to 38 μm.

Figure 8:
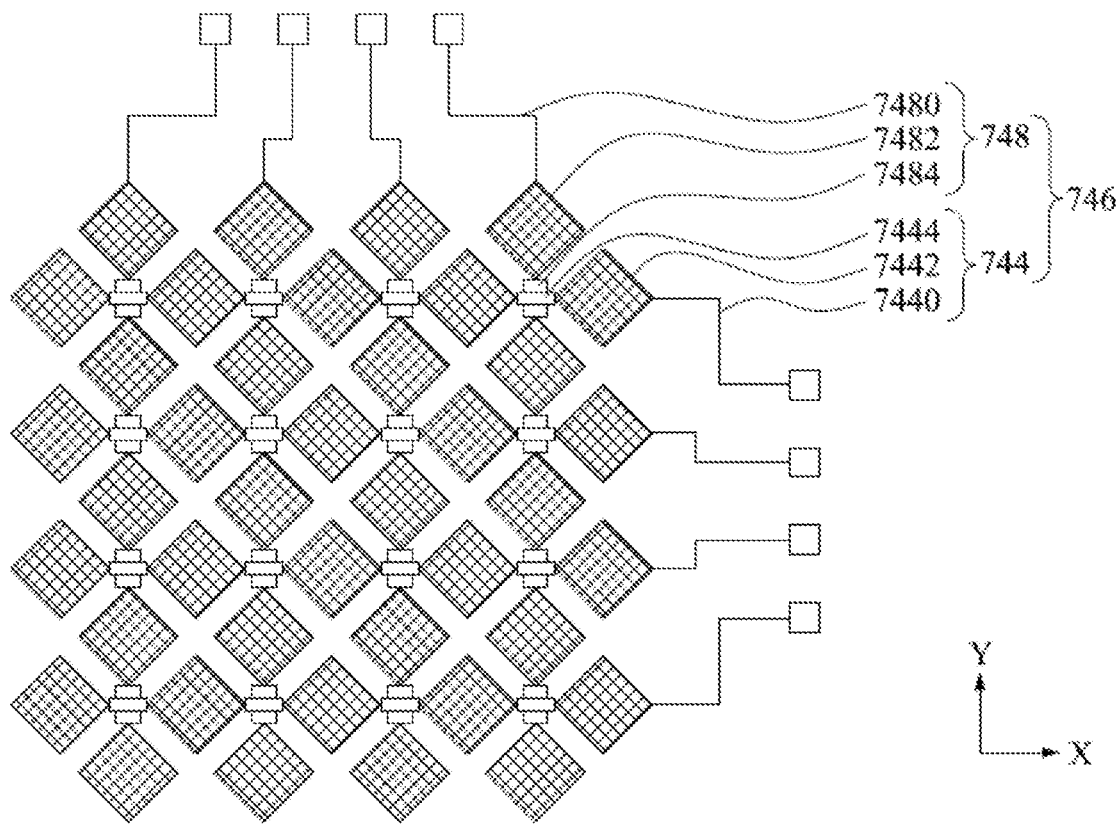
FIG. 8 shows a top view of the first patterned sensing lines and second patterned sensing lines in FIG. 7B according to some embodiments of the instant disclosure.

According to some embodiments of the instant disclosure, the patterned sensing lines 746 includes a plurality of first patterned sensing lines 744 and a plurality of second patterned sensing lines 748 intersecting each other in a same layer. FIG. 8 shows a top view of the first patterned sensing lines 744 and second patterned sensing lines 748 of FIG. 7B according to some embodiments of the instant disclosure. The first patterned sensing lines 744 and second patterned sensing lines 748 intersect and are biaxially oriented. The first patterned sensing lines 744 include a plurality of first conducting lines 7440, a plurality of electrodes 7442 arranged along the X axis and a plurality of electric bridges 7444 connecting the electrodes 7442. The second patterned sensing lines 748 includes a plurality of second conducting lines 7480, a plurality of electrodes 7482 arranged along the Y axis and a plurality of insulating layers 7484 connecting the electrodes 7482. The first patterned sensing lines 744 and second patterned sensing lines 748 intersect and are biaxially oriented. The plurality of electric bridges 7444 cross over the plurality of insulating layers 7484 to connect the plurality of adjacent electrodes 7442 therebetween. The first patterned sensing lines 744 and the second patterned sensing lines 748 are electrically insulated from each other. The electrode shape of shown by FIG. 8A is a rhombus, without limitation thereto. The electrode shape may be square, rectangle, regular hexagon, or an irregular pattern with randomized arrangement.

As shown in FIGS. 7A and 7B, the first patterned sensing lines 744 and the second patterned sensing lines 748 are positioned under the adhesive bearing layer 742. The adhesive bearing layer 742 is used as a bearing substrate of the first patterned sensing lines 744 and the second patterned sensing lines 748. Further, the adhesive bearing layer 742 adheres the first patterned sensing lines 744 and the second patterned sensing lines 748 to the cover plate 720. Because the adhesive bearing layer 742 does not need to cover the difference in etching step height of the first patterned sensing lines 744 and the second patterned sensing lines 748, thickness of the adhesive bearing layer 742 ranges from 25 μm to 30 μm.

Referring to FIG. 7B, a method for fabricating the touch panel 740 is now described. The method includes at least the following steps. An adhesive bearing layer 742 is provided. A conducting layer is coated under the adhesive bearing layer 742. The conducting layer is etched to form the first patterned sensing lines 744 and the second patterned sensing lines 748. The first patterned sensing lines 744 and the second patterned sensing lines 748 are electrically insulated from and intersected with each other in a same layer. A cover plate 720 is provided and the first patterned sensing lines 744 and the second patterned sensing lines 748 are adhered to the cover plate 720 by the adhesive bearing layer 742. Please refer to the schematic diagrams of fabrication method and the cross-section views for coating conducting layer over the adhesive bearing layer as shown in FIG. 2A to FIG. 3B for description of the steps of coating these conducting layers.

Figure 9A:
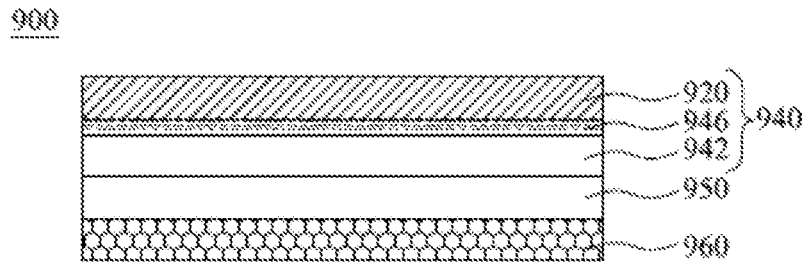
FIG. 9A shows a touch device according to some embodiments of instant disclosure.
Figure 9B:
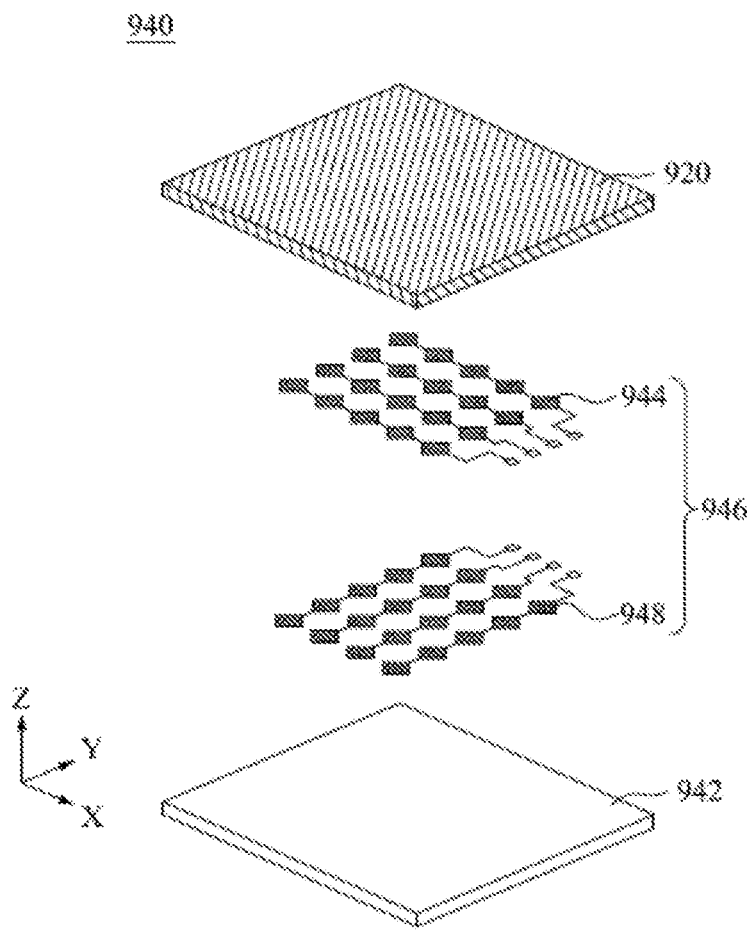
FIG. 9B shows a schematic diagram of the touch panel in FIG. 9A.

FIG. 9A shows a touch device 900 according to some embodiments of the instant disclosure. FIG. 9B shows a schematic diagram of a touch panel 940 of FIG. 9A. The touch device 900 includes the touch panel 940, an adhesive layer 950, and a display panel 960. The touch panel 940 includes a cover plate 920, an adhesive bearing layer 942, and a plurality of patterned sensing lines 946. The patterned sensing lines 946 are directly formed on the adhesive bearing layer 942 such that a lower surface of the patterned sensing lines 946 are in direct contact with the adhesive bearing layer 942. The patterned sensing lines 946 and the adhesive bearing layer 942 form an adhesive component. The adhesive layer 950 is between the touch panel 940 and the display panel 960 to adhere the touch panel 940 to the display panel 960. A thickness of the adhesive layer 950 ranges from 15 μm to 20 μm. According to some embodiments of the instant disclosure, the adhesive bearing layer 942 may directly adhere to the display panel 960.

According to some embodiments of the instant disclosure, the patterned sensing lines 946 include a plurality of first patterned sensing lines 944 and a plurality of second patterned sensing lines 948. The first patterned sensing lines 944 and the second patterned sensing lines 948 intersect in a same layer and are electrically insulated from each other. Please refer to description of the first patterned sensing lines 744 and the second patterned sensing lines 748 as shown in FIG. 8 for details of the first patterned sensing lines 944 and the second patterned sensing lines 948.

As shown in FIGS. 9A and 9B, the first patterned sensing lines 944 and the second patterned sensing lines 948 are positioned over the adhesive bearing layer 942. The adhesive bearing layer 942 is used as a bearing substrate of the first patterned sensing lines 944 and the second patterned sensing lines 948. Further, the adhesive bearing layer 942 adheres the first patterned sensing lines 944 and the second patterned sensing lines 948 to the cover plate 920. In order to fully cover the first patterned sensing lines 944 and the second patterned sensing lines 948 and overcome a difference in etching step height of the first patterned sensing lines 944 and the second patterned sensing lines 948, a thickness of the adhesive layer 942 increases accordingly. A thickness of the adhesive bearing layer 942 ranges from 40 μm to 60 μm.

Further, it is worth noting that although FIG. 9A shows the area of the adhesive bearing layer 942 as being the same as the area of the patterned sensing lines 946, the area of the adhesive bearing layer 942 is generally larger than the area of the patterned sensing lines 946 in actual fabrication. More specifically, the patterned sensing lines 946 are practically positioned at a central region (corresponding to a visual region of touch panel 940) of the adhesive bearing layer 942. A peripheral region (corresponding to a non-visible region of touch panel 940) of the adhesive bearing layer 942 still remains a certain area to adhere the patterned sensing lines 946 to the cover plate 920.

As shown in FIG. 9B, a method for fabricating the touch panel 940 is provided. The method includes at least the following steps. An adhesive bearing layer 942 is provided.

A conducting layer is coated over the adhesive bearing layer 942. The conducting layer is etched to form the first patterned sensing lines 944 and the second patterned sensing lines 948. The first patterned sensing lines 944 and the second patterned sensing lines 948 are electrically insulated from and intersecting with each other in a same layer. A cover plate 920 is provided and the first patterned sensing lines 944 and the second patterned sensing lines 948 are adhered to the cover plate 920 by the adhesive bearing layer 942. Please refer to description of the schematic diagrams of fabrication method and the cross-section views for coating conducting layer over the adhesive bearing layer as shown in FIG. 2A to FIG. 3B for description of the step of coating these conducting layers.

The etching method and the material of cover plate and adhesive bearing layer of embodiments shown in FIGS. 2-9B refer to the embodiment of FIG. 1 shown.

From the above embodiments of instant disclosure, the disclosure has the following advantages. In touch panel, the patterned sensing lines are directly formed on the adhesive bearing layer rather than a bearing substrate. Therefore, the steps in process of fabricating touch panel are simplified. The number of adhesion process steps is reduced and the production yield is promoted as well. The touch panel becomes thinner and lighter. The cost is reduced and adaptability is extended.

Although the instant disclosure has been described in considerable detail with reference to certain embodiments thereof, other embodiments are possible. Therefore, the spirit and scope of the appended claims should not be limited to the description of the embodiments contained herein.

What is claimed is:

1. A method of fabricating a touch panel, comprising:
   providing a cover plate;
   adhering a first adhesive component underneath the cover plate, comprising:
      removing a first release film from a first adhesive bearing layer to expose a first sticky surface of the first adhesive bearing layer;
      coating a first conducting layer on the first sticky surface of the first adhesive bearing layer; and
      patterning the first conducting layer to form a plurality of first patterned sensing lines, wherein the patterning the first conducting layer comprises etching the first conducting layer; and
   directly adhering a second adhesive component to the first adhesive component, comprising:
      removing a second release film from a second adhesive bearing layer to expose a first sticky surface of the second adhesive bearing layer and removing a third release film from the second adhesive bearing layer to expose a second sticky surface of the second adhesive bearing layer;
      directly adhering the first sticky surface of the second adhesive bearing layer to the first sticky surface of the first adhesive bearing layer;
      coating a second conducting layer on the second sticky surface of the second adhesive bearing layer; and
      patterning the second conducting layer to form a plurality of second patterned sensing lines, wherein:
         the patterning the second conducting layer comprises etching the second conducting layer, and
         the plurality of first patterned sensing lines are electrically insulated from the plurality of second patterned sensing lines.

2. The method of claim 1, wherein the directly adhering the second adhesive component to the first adhesive component comprises:
   using the second adhesive bearing layer to adhere the plurality of second patterned sensing lines to the first adhesive component.

3. The method of claim 1, wherein the adhering the first adhesive component underneath the cover plate comprises:
   removing a fourth release film from the first adhesive bearing layer to expose a second sticky surface of the first adhesive bearing layer, and
   directly adhering the second sticky surface of the first adhesive bearing layer to the cover plate.

4. The method of claim 1, wherein the etching the first conducting layer comprises performing at least one of laser etching, chemical etching, plasma etching, or photolithography.

5. The method of claim 1, wherein the etching the second conducting layer comprises performing at least one of laser etching, chemical etching, plasma etching, or photolithography.

6. The method of claim 1, wherein the adhering the first adhesive component underneath the cover plate comprises:
   removing a fourth release film from the first adhesive bearing layer to expose a second sticky surface of the first adhesive bearing layer, and
   adhering the second sticky surface of the first adhesive bearing layer to the cover plate after the patterning the first conducting layer.

7. The method of claim 1, wherein the first conducting layer comprises silver nanowires.

8. The method of claim 1, wherein the directly adhering the second adhesive component to the first adhesive component comprises:
   adhering the first sticky surface of the second adhesive bearing layer to first sticky surface of the first adhesive bearing layer after the patterning the second conducting layer.

9. A method of fabricating a touch panel, comprising:
   providing a cover plate;
   adhering a first adhesive component underneath the cover plate, comprising:
      removing a first release film from a first adhesive bearing layer to expose a first sticky surface of the first adhesive bearing layer;
      coating a first conducting layer on the first sticky surface of the first adhesive bearing layer; and
      patterning the first conducting layer to form a plurality of first patterned sensing lines, wherein:
         the patterning the first conducting layer comprises etching the first conducting layer, and
         the plurality of first patterned sensing lines and the first adhesive bearing layer together define the first adhesive component;
   removing a second release film from a second adhesive bearing layer to expose a first sticky surface of the second adhesive bearing layer and removing a third release film from the second adhesive bearing layer to expose a second sticky surface of the second adhesive bearing layer;
   coating a second conducting layer on the second sticky surface of the second adhesive bearing layer;
   patterning the second conducting layer to form a plurality of second patterned sensing lines, wherein:
      the patterning the second conducting layer comprises etching the second conducting layer, and the plurality of second patterned sensing lines and the second adhesive bearing layer together define a second adhesive component; and directly adhering the first sticky surface of the second adhesive bearing layer to the first sticky surface of the first adhesive bearing layer after the patterning the second conducting layer.

10. The method of claim 9, wherein the etching the first conducting layer comprises performing at least one of laser etching, chemical etching, plasma etching, or photolithography.

11. The method of claim 9, wherein the etching the second conducting layer comprises performing at least one of laser etching, chemical etching, plasma etching, or photolithography.

12. The method of claim 9, wherein the first conducting layer comprises silver nanowires.

13. The method of claim 9, wherein the directly adhering first sticky surface of the second adhesive component to the first sticky surface of the first adhesive bearing layer comprises:

using the second adhesive bearing layer to adhere the plurality of second patterned sensing lines to the first adhesive component.

14. A method of fabricating a touch panel, comprising:
providing a cover plate;
adhering a first adhesive component directly underneath the cover plate, comprising:
removing a first release film from a first adhesive bearing layer to expose a first sticky surface of the first adhesive bearing layer;
coating a first conducting layer on the first sticky surface of the first adhesive bearing layer; and
patterning the first conducting layer to form a plurality of first patterned sensing lines, wherein the patterning the first conducting layer comprises etching the first conducting layer; and
directly adhering a second adhesive component to the first adhesive component, comprising:
removing a second release film from a second adhesive bearing layer to expose a first sticky surface of the second adhesive bearing layer and removing a third release film from the second adhesive bearing layer to expose a second sticky surface of the second adhesive bearing layer;
coating a second conducting layer on the seconder sticky surface of the second adhesive bearing layer; and
patterning the second conducting layer to form a plurality of second patterned sensing lines, wherein:
the patterning the second conducting layer comprises etching the second conducting layer, and
the plurality of first patterned sensing lines are electrically insulated from the plurality of second patterned sensing lines; and
directly adhering the first sticky surface of the second adhesive bearing layer to the first sticky surface of the first adhesive bearing layer.

15. The method of claim 14, wherein the directly adhering the second adhesive component to the first adhesive component comprises:
using the second adhesive bearing layer to adhere the plurality of second patterned sensing lines to the first adhesive component.

16. The method of claim 14, wherein the adhering the first adhesive component directly underneath the cover plate comprises:
removing a fourth release film from the first adhesive bearing layer to expose a second sticky surface of the first adhesive bearing layer, and
directly adhering the second sticky surface of the first adhesive bearing layer to the cover plate.

17. The method of claim 14, wherein the etching the first conducting layer comprises performing at least one of laser etching, chemical etching, plasma etching, or photolithography.

18. The method of claim 14, wherein the etching the second conducting layer comprises performing at least one of laser etching, chemical etching, plasma etching, or photolithography.

19. The method of claim 14, wherein the adhering the first adhesive component directly underneath the cover plate comprises:
removing a fourth release film from the first adhesive bearing layer to expose a second sticky surface of the first adhesive bearing layer, and
adhering the second sticky surface of the first adhesive bearing layer to the cover plate after the patterning the first conducting layer.

20. The method of claim 14, wherein the first conducting layer comprises silver nanowires.

* * * * *